United States Patent
Ford et al.

(10) Patent No.: US 10,800,396 B2
(45) Date of Patent: Oct. 13, 2020

(54) METHODS AND SYSTEM FOR ADAPTING OPERATION OF A DRIVELINE DISCONNECT CLUTCH

(71) Applicant: Ford Global Technologies, LLC, Dearborn, MI (US)

(72) Inventors: Stuart Ford, Farmington Hills, MI (US); Alexander O'Connor Gibson, Ann Arbor, MI (US); Corey Blue, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 15/840,553

(22) Filed: Dec. 13, 2017

(65) Prior Publication Data

US 2019/0176798 A1    Jun. 13, 2019

(51) Int. Cl.
*B60W 20/00*    (2016.01)
*B60K 6/387*    (2007.10)
*F16D 48/06*    (2006.01)

(52) U.S. Cl.
CPC ............ *B60W 20/00* (2013.01); *B60K 6/387* (2013.01); *F16D 48/06* (2013.01); *B60W 2510/0685* (2013.01); *B60W 2710/06* (2013.01); *B60Y 2200/92* (2013.01); *F16D 2500/1066* (2013.01); *F16D 2500/10412* (2013.01); *F16D 2500/30806* (2013.01); *Y10S 903/914* (2013.01)

(58) Field of Classification Search
CPC ......... B60W 20/00; B60W 2510/0685; B60W 2710/06; B60K 6/387; F16D 48/06; F16D 2500/10412; F16D 2500/1066; F16D 2500/30806; B60Y 2200/92; Y10S 903/914
USPC .......................................................... 701/22
See application file for complete search history.

(56) References Cited

U.S. PATENT DOCUMENTS

| | | | |
|---|---|---|---|
| 6,998,477 B1 | 2/2006 | Ueki et al. | |
| 7,980,222 B2 | 7/2011 | Stephan et al. | |
| 8,689,757 B2 | 4/2014 | Lee et al. | |
| 8,886,425 B2 * | 11/2014 | Doering | B60K 6/48 701/55 |
| 8,932,179 B2 * | 1/2015 | Banker | B60W 10/184 477/4 |
| 9,039,570 B2 | 5/2015 | Doering et al. | |
| 9,108,614 B2 | 8/2015 | Doering et al. | |
| 9,108,632 B2 | 8/2015 | Gibson et al. | |
| 9,156,469 B2 | 10/2015 | Gibson et al. | |
| 9,527,505 B1 | 12/2016 | Gibson et al. | |
| 2004/0045519 A1 | 3/2004 | Buglione et al. | |
| 2009/0212569 A1 | 8/2009 | Bauer | |
| 2015/0144099 A1 | 5/2015 | Straker et al. | |

* cited by examiner

*Primary Examiner* — Gertrude Arthur Jeanglaude
(74) *Attorney, Agent, or Firm* — David Kelley; McCoy Russell LLP

(57) ABSTRACT

Systems and methods for operating a hybrid powertrain that includes an engine and a motor/generator are described. The systems and methods provide a way of prepositioning an engine to improve a range of driveline disconnect clutch transfer function adaptation. In one example, an engine is positioned at a location where its torque to turn exceeds a threshold torque.

19 Claims, 6 Drawing Sheets

METHODS AND SYSTEM FOR ADAPTING OPERATION OF A DRIVELINE DISCONNECT CLUTCH

FIELD

The present description relates to methods and a system for operating a powertrain of a hybrid vehicle. The methods and systems may be particularly useful for hybrid vehicles that include a driveline disconnect clutch.

BACKGROUND AND SUMMARY

A hybrid vehicle may include a driveline disconnect clutch to selectively engage and disengage an engine from an electric machine and a transmission. The driveline disconnect clutch may be open during low driver demand periods when the electric machine is capable of providing the driver demand torque. The driveline disconnect clutch may be closed in response to a driver demand torque that is greater than the capacity of the electric machine or in response to a low state of battery charge. The driveline disconnect clutch may be commanded to provide a specific torque capacity during the driveline disconnect clutch closing process so that a large torque disturbance may not be felt by vehicle occupants when the driveline disconnect clutch is closed. The driveline disconnect clutch torque capacity may be a function of application pressure applied to close the driveline disconnect clutch. However, the relationship between application pressure and torque capacity of the driveline disconnect clutch may be different from vehicle to vehicle. Further, the relationship between application pressure and torque capacity of the driveline disconnect clutch may change as the vehicle ages. As a result, if a driveline disconnect clutch is closed based on an application pressure to torque capacity relationship that was developed by the vehicle manufacturer and that is different than the application pressure to torque capacity relationship for a particular vehicle, then driveline torque disturbances may occur in the particular vehicle. Therefore, it would be desirable to operate a driveline disconnect clutch of a particular vehicle based on a driveline disconnect clutch application pressure to torque capacity relationship for the particular vehicle.

The inventors herein have recognized the above-mentioned issues and have developed a vehicle operating method, comprising: requesting adjustment of an application force to clutch torque capacity relationship; adjusting a stopping position of an engine in response to the request; and adjusting the application force to clutch torque capacity relationship.

By adjusting a stopping position of an engine responsive to a request to adjust an application force to clutch torque capacity relationship, it may be possible to provide the technical result of increasing torque to turn the engine so that a larger range of the application force to clutch torque capacity relationship may be adjusted. In particular, the engine is coupled to one side of a driveline disconnect clutch and the other side of the driveline disconnect clutch is coupled to an electric machine. The engine may operate as a grounding device that limits one side of the driveline disconnect clutch from moving so long as an amount of torque transferred via the driveline disconnect clutch does not exceed a torque to turn the engine. If the engine stopping position is adjusted to a position that requires a higher torque to turn the engine, then the application force to clutch torque capacity may be adapted from zero torque up to the torque to turn the engine. In this way, a range to adapt the application force to clutch torque capacity relationship may be increased to provide a more complete driveline disconnect transfer function adaptation.

The present description may provide several advantages. For example, the approach may provide an improved prediction of driveline disconnect clutch torque so that driveline torque compensation may be improved. Further, the approach may be provided without additional engine sensors or actuators. Further still, the approach may improve driveline disconnect clutch transfer function adaptation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
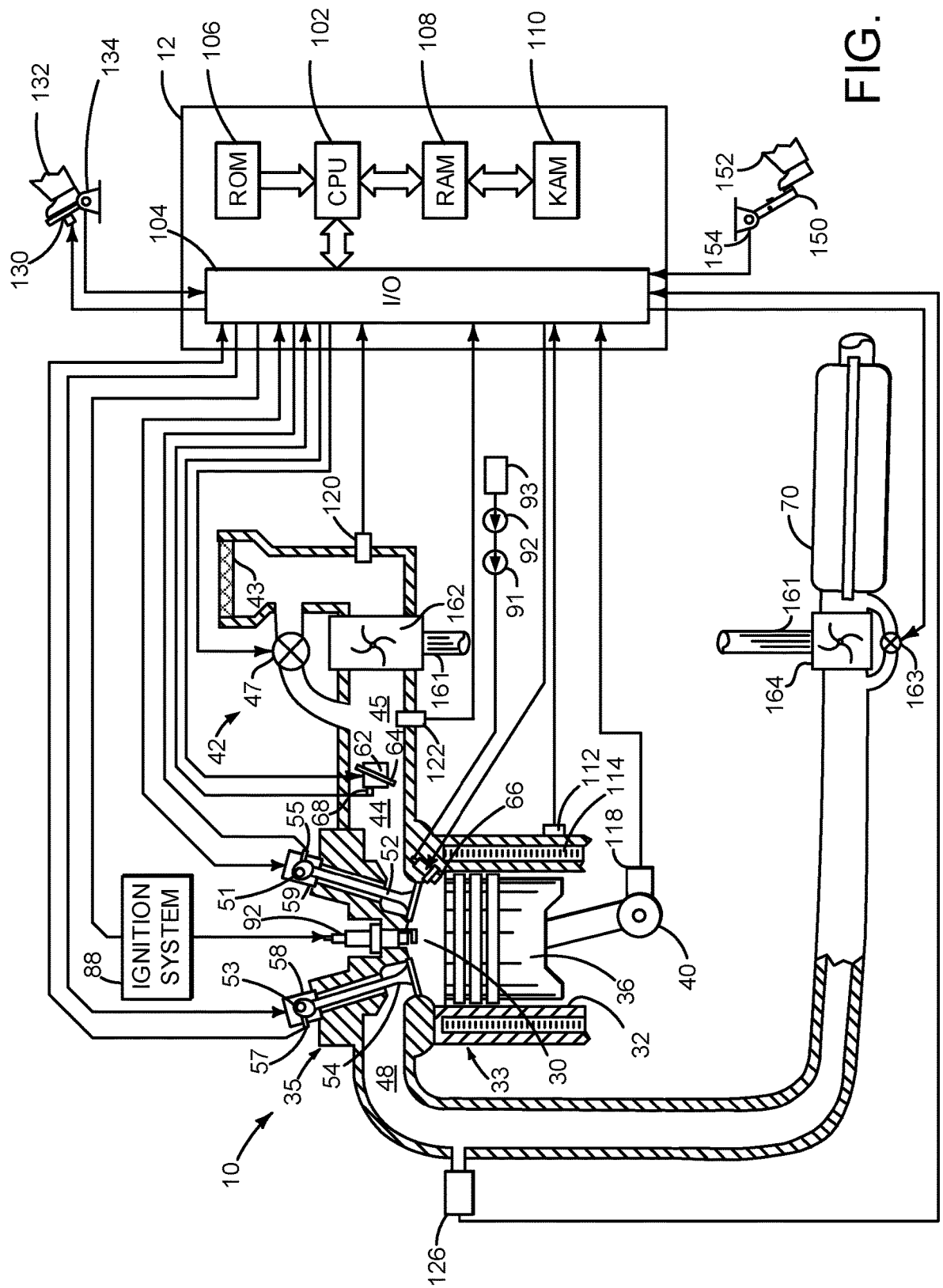
FIG. 1 is a schematic diagram of an engine.
Figure 2:
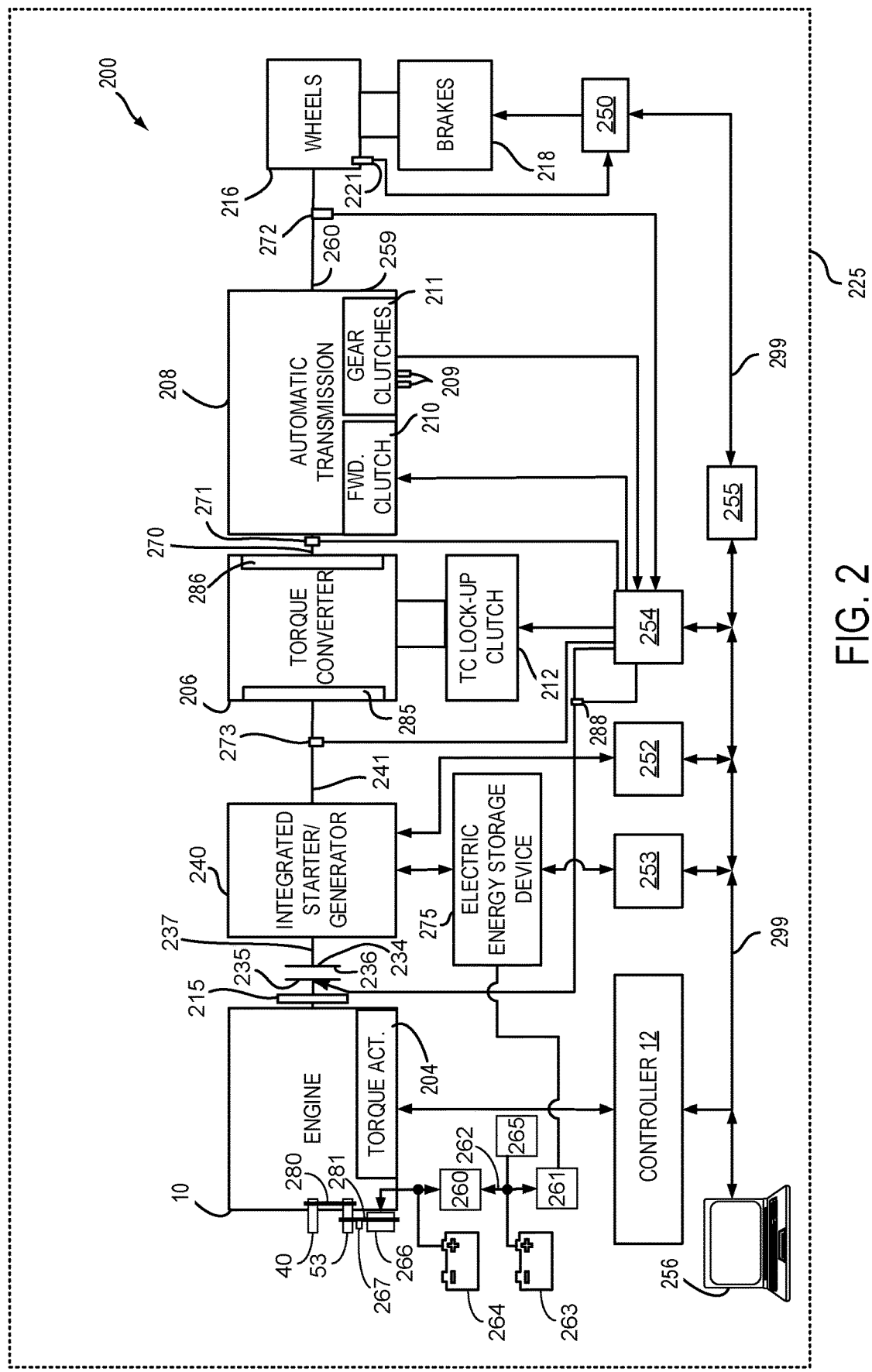
FIG. 2 is a schematic diagram of a hybrid vehicle powertrain.
Figure 3A:
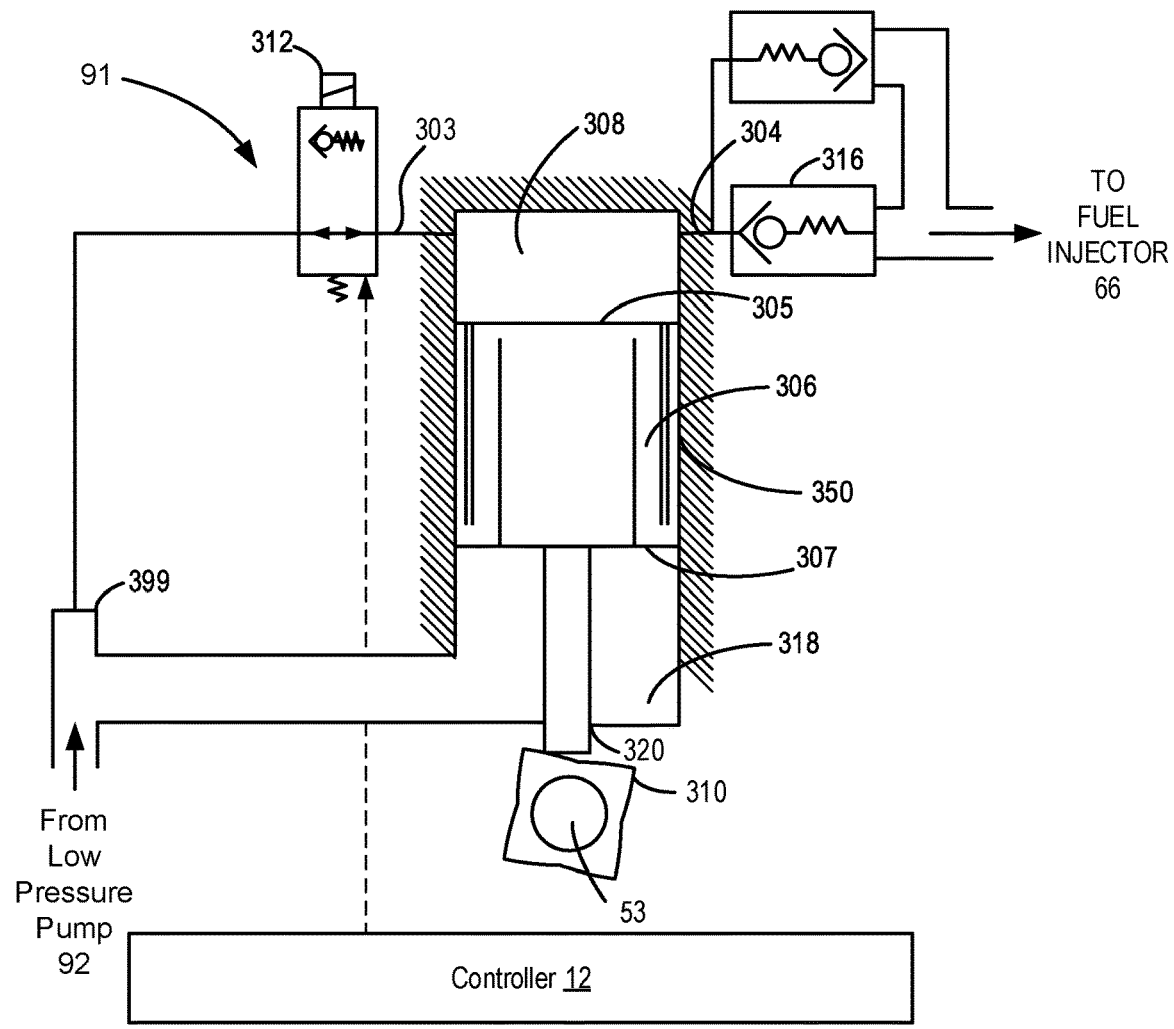
FIG. 3A is a schematic diagram of an example fuel pump.
Figure 3B:
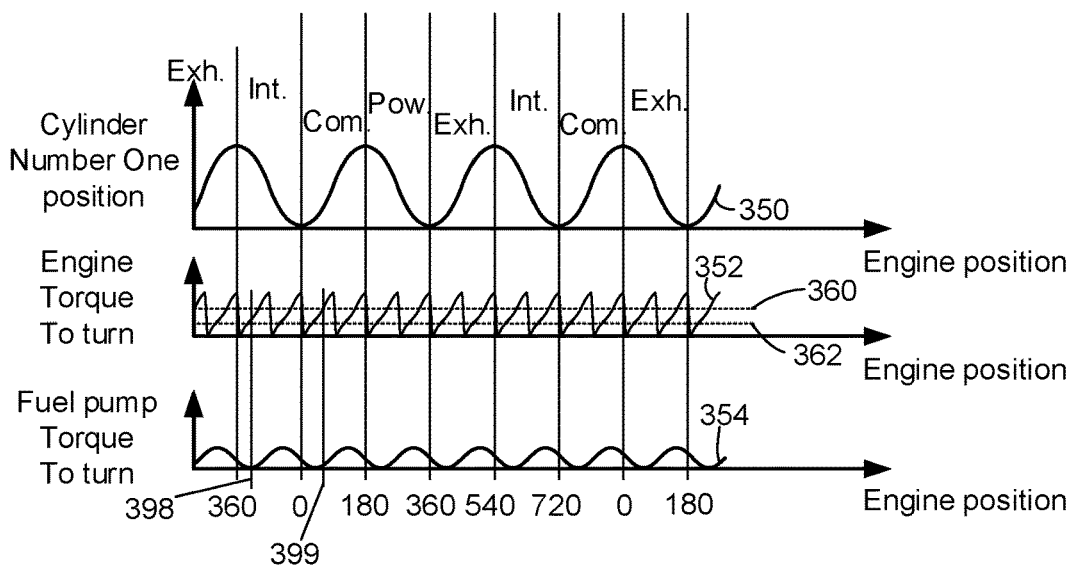
FIG. 3B is a plot showing example engine stopping positions relative to engine position and fuel pump torque to turn.
Figure 4:
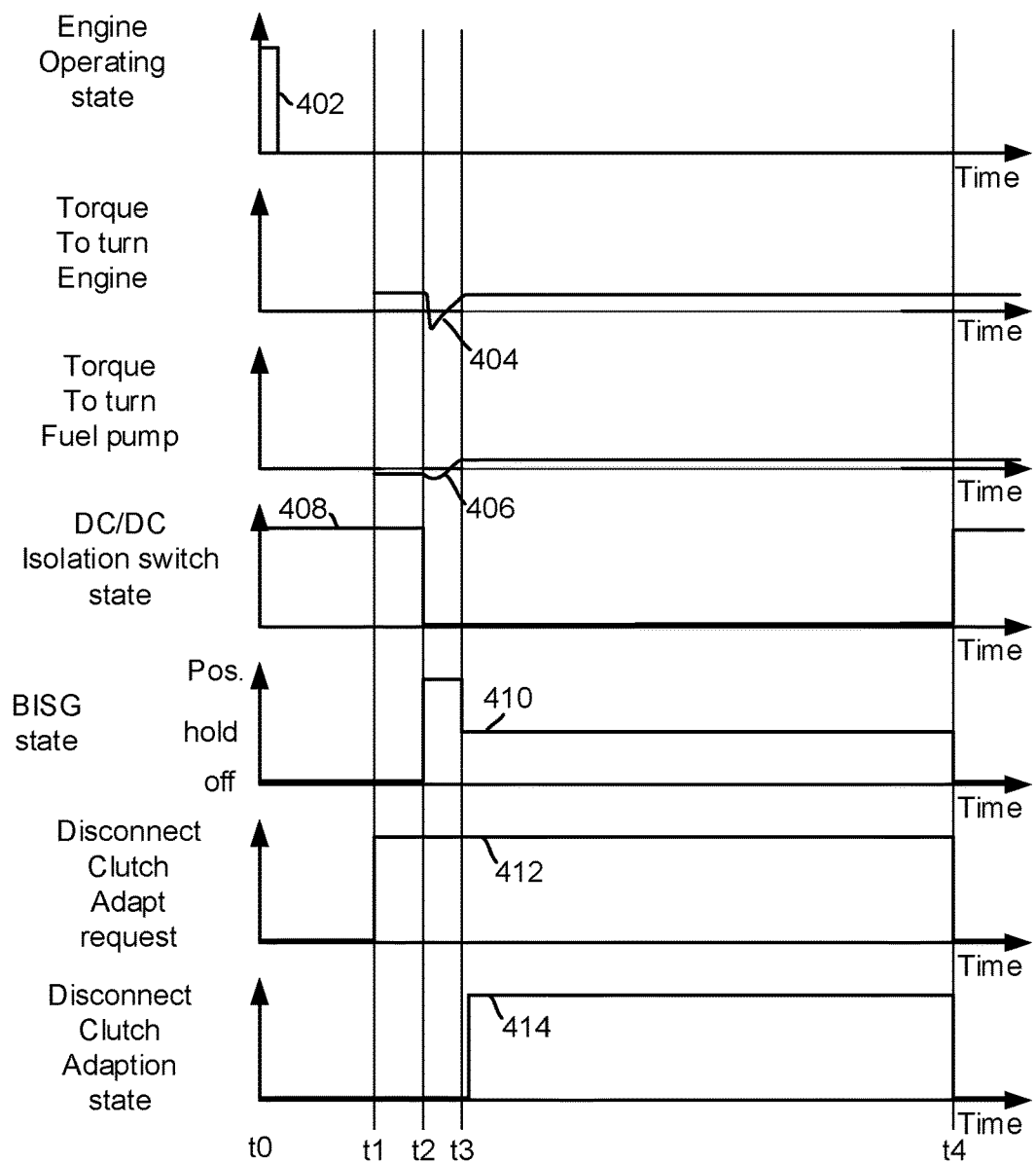
FIG. 4 is a plot that shows an example driveline disconnect clutch adaptation sequence.
Figure 5:
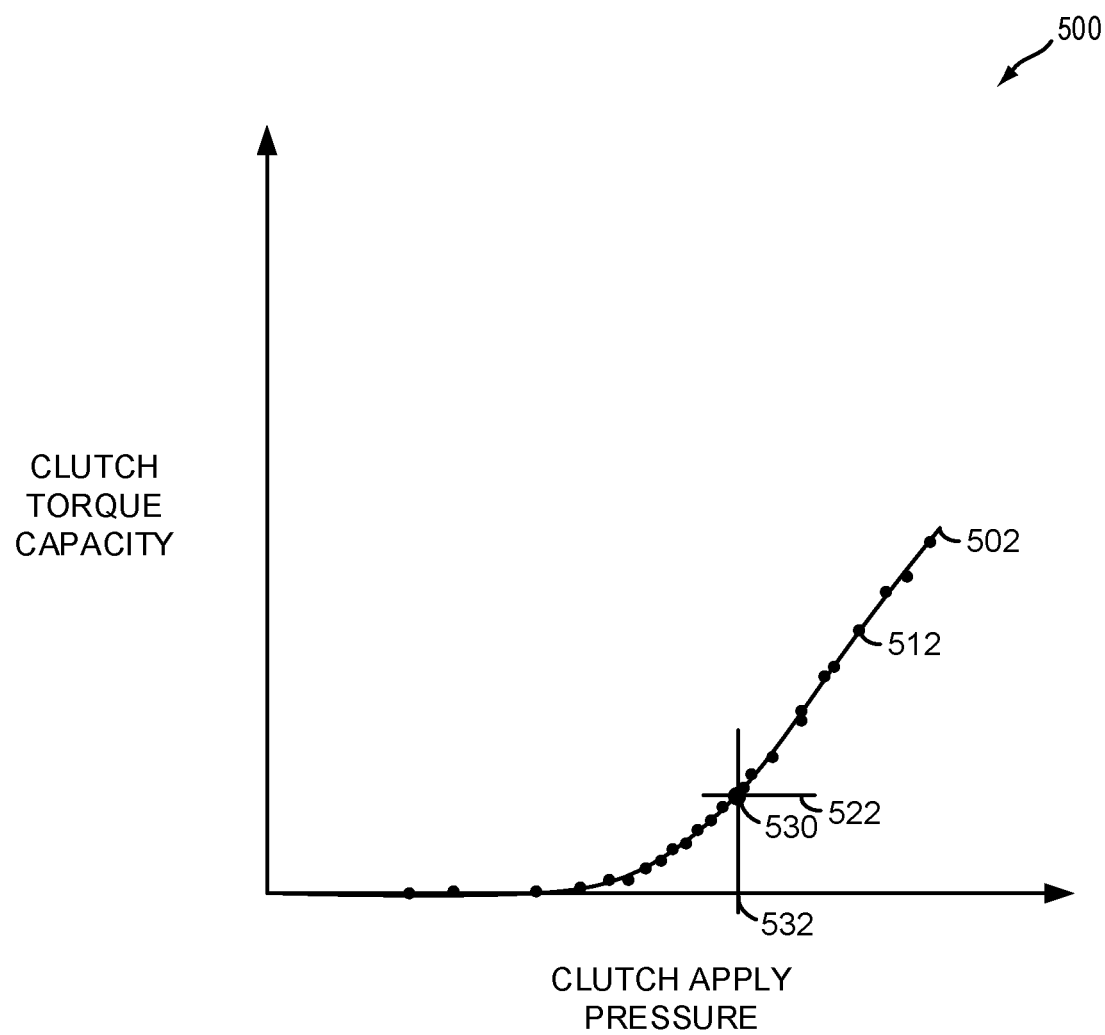
FIG. 5 is a plot of an example driveline disconnect application force to clutch torque capacity relationship.
Figure 6:
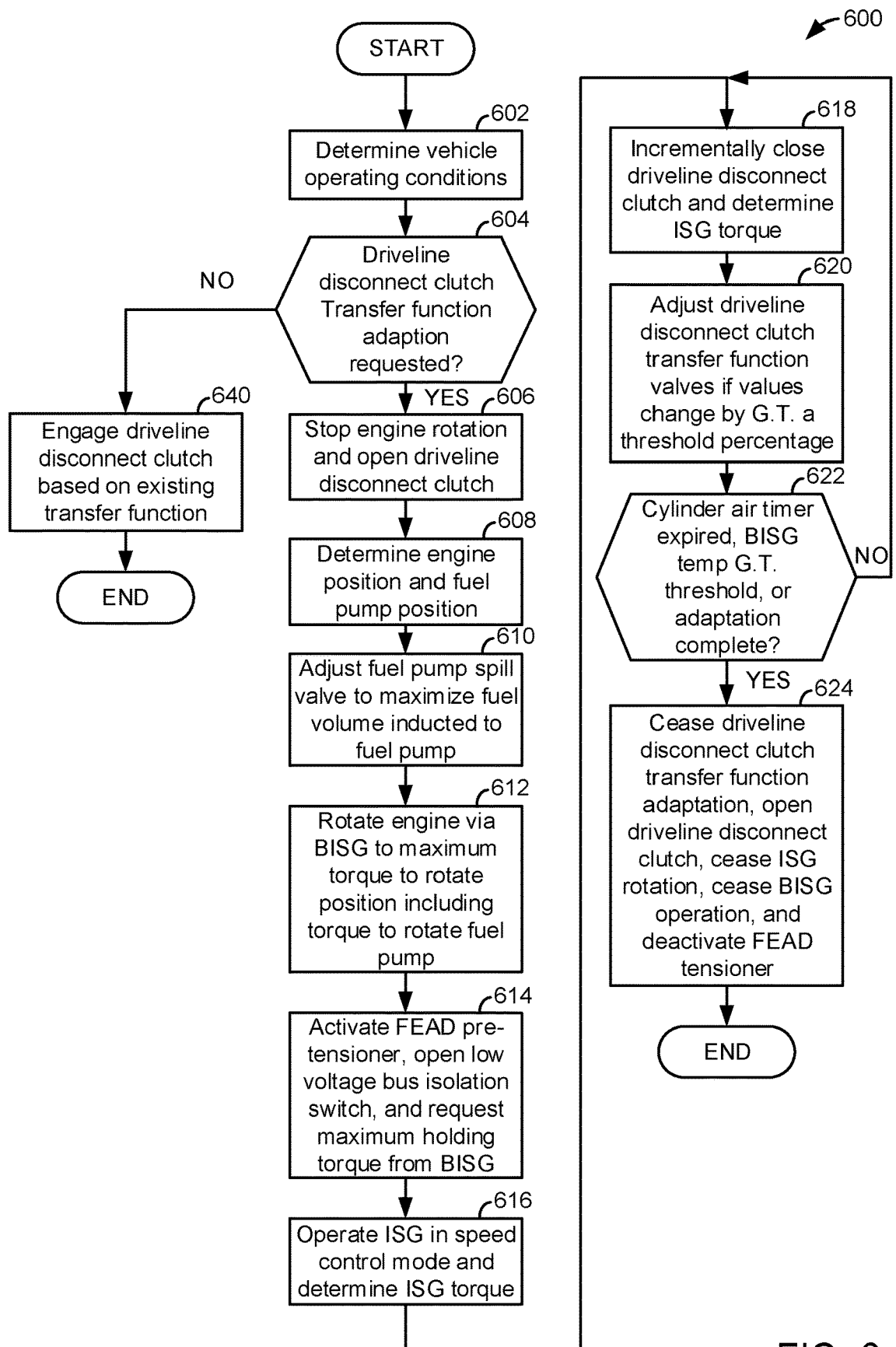
FIG. 6 shows an example flowchart of a method for operating a driveline and adapting a driveline disconnect clutch application force to clutch torque capacity relationship.

The present description is related to adapting a application force to clutch torque capacity relationship for a driveline disconnect clutch of a hybrid vehicle. A driveline disconnect clutch transfer function that describes an application force to clutch torque capacity relationship may be adapted or adjusted from time to time to improve driveline disconnect clutch control. The driveline disconnect clutch may be coupled to an engine, such as the engine illustrated in FIG. 1. The driveline disconnect clutch may also be included in a hybrid vehicle driveline or powertrain as shown in FIG. 2. Engine torque to turn (e.g., an amount of torque that needs to be applied to a stopped engine before the engine will rotate, not including torque to rotate the engine's mechanically driven fuel pump) may be increased prior to adapting a driveline disconnect clutch transfer function so that a larger range of application forces may be mapped. FIG. 3A shows an example fuel pump that has a fuel pump torque to turn (e.g., an amount of torque that needs to be applied to a stopped fuel pump before the fuel pump will rotate, not including torque to rotate the engine without the fuel pump) that is engine position sensitive. FIG. 3B shows how engine position may be adjusted based on the fuel pump position, which is related to the fuel pump's torque to turn. An example driveline disconnect clutch adaptation sequence is shown in FIG. 4. An application force to driveline disconnect clutch torque capacity relationship for a driveline disconnect clutch is shown in FIG. 5. Finally, a method for operating a driveline and adapting an application force to driveline disconnect clutch torque capacity relationship is shown in FIG. 6. Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system including a fuel tank 93, mechanical high pressure fuel pump 91, and low pressure fuel pump 92.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Engine speed at sensor 118 is equal to speed of first side 235 of driveline disconnect clutch 236 shown in FIG. 2. Force applied to close driveline disconnect clutch 236 may be estimated via sensor 288 shown in FIG. 2. Sensor 288 may be a current sensor, pressure sensor, or position sensor depending on the type of force that is applied to close driveline disconnect clutch 236.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions. Status information may be provided to a driver via human/machine interface 256 (e.g., keyboard and display).

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, powertrain control devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

Belt integrated starter/generator (BISG) 266 is mechanically coupled to exhaust cam 53 of engine 10 via belt 281. Exhaust cam 53 is coupled to crankshaft 40 via chain 280. Active belt tensioner 267 may be selectively activated via controller 12 to reduce belt compliance when engine 10 may be rotated in reverse via BISG 266. BISG 266 may be operated to provide torque to powertrain 200 or to convert powertrain torque into electrical energy to be stored in 12 volt battery 264 in a regeneration mode. BISG 266 may provide torque to crank and start engine 10. BISG 266 has a lower output torque capacity than ISG 240. BISG 266 is electrically coupled to 12 volt battery 264 and electric isolation switch 260. Electric isolation switch 260 may decouple BISG 266 and 12 volt battery 264 from low voltage bus 262. Battery 264 may supply power to rotate BISG 266. Auxiliary battery 263 may supply electrical power to ancillary devices 265 (e.g., electrical steering assist, window motors, etc.). DC/DC converter 261 may reduce voltage of electric energy storage device 275 to supply electrical energy to low voltage bus 262 and auxiliary battery 263.

ISG 240 may be operated to provide torque to powertrain 200 or to convert powertrain torque into electrical energy to be stored in electric energy storage device 275 in a regeneration mode. ISG 240 has a higher output torque capacity than belt integrated starter/generator 266 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. Speed sensor 273 senses torque converter impeller speed, which is equal to speed of the second side 234 of driveline disconnect clutch 236. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG 240. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position or torque converter turbine speed via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 3A, a detailed view of mechanically driven fuel pump 91 is shown. Inlet 303 of direct injection fuel pump compression chamber 308 is supplied fuel via a low pressure fuel pump (e.g., 92 shown in FIG. 2). The fuel may be pressurized upon its passage through mechanically driven fuel pump 91 and supplied to a fuel rail through pump outlet 304. In the depicted example, the mechanically driven fuel pump 91 may be a mechanically-driven displacement pump that includes an injection pump cylinder 350, injection pump piston 306, injection pump piston rod 320, a pump compression chamber 308 (herein also referred to as compression chamber), and a step-room 318. Injection pump piston 306 includes a top 305 and a bottom 307. The step-room and compression chamber may include cavities positioned on opposing sides of the pump piston. In one example, the injection pump piston 306 in mechanically driven fuel pump 91 is driven by cam lobe 310 via rod 320. Exhaust camshaft 53 includes four cam lobes 310 and it completes one rotation for every two engine crankshaft rotations. In other examples, cam lobes 310 may be fewer lobes. Cam lobes 310 rotate as exhaust camshaft 53 rotates.

Solenoid activated spill valve 312 (e.g., a solenoid activated inlet check valve) may be coupled to pump inlet 303. Controller 12 may be configured to regulate fuel flow through solenoid activated spill valve 312 by energizing or de-energizing the solenoid valve (based on the solenoid valve configuration) in synchronism with the driving exhaust camshaft 53 and cam lobes 310. Spill valve 312 may also be energized and independent of exhaust camshaft 53 and cam lobes 310. Accordingly, solenoid activated spill valve 312 may be operated in at least two modes. In a first mode, solenoid activated spill valve 312 is positioned within inlet 303 to limit (e.g. inhibit) the amount of fuel traveling upstream of the solenoid activated spill valve 312 and exiting the inlet 303. In comparison, in the second mode, solenoid activated spill valve 312 is effectively disabled and fuel can travel upstream and downstream of solenoid activated spill valve 312.

As such, solenoid activated spill valve 312 may regulate the mass of fuel compressed into the mechanically driven fuel pump 91. In one example, controller 12 may adjust a closing timing of the solenoid activated spill valve 312 to regulate the mass of fuel compressed. For example, a late solenoid activated spill valve closing time (e.g., 20 degrees before piston 306 reaches top-dead-center compression stroke) may reduce the amount of fuel mass ingested into the compression chamber 308 while early solenoid activated spill valve closing time (e.g., 140 degrees before piston 306 reaches top-dead-center compression stroke) may increase the amount of fuel mass ingested into the pump, thereby increasing the torque to turn mechanically driven fuel pump 91. The solenoid activated spill valve opening and closing timings may be coordinated with respect to stroke timings of the mechanically driven fuel pump 91. Further, by allowing a larger volume of fuel into compression chamber 308 via adjusting opening and closing time of solenoid activated spill valve 312, torque to turn mechanically driven fuel pump 91 may be increased.

Conduit 399 allows fuel to solenoid operated check valve 312 so that solenoid operated check valve 312 may adjust the amount of fuel being pumped so as to regulate fuel pressure in the high pressure fuel rail. Injection pump piston 306 reciprocates up and down in cylinder 350. Mechanically driven fuel pump 91 is in a compression stroke when piston 306 is traveling in a direction that reduces the volume of compression chamber 308. Mechanically driven fuel pump 91 is in a suction stroke when injection pump piston 306 is traveling in a direction that increases the volume of compression chamber 308.

A forward flow outlet check valve 316 may be coupled downstream of an outlet 304 of the compression chamber 308. Outlet check valve 316 opens to allow fuel to flow from the compression chamber outlet 304 into a fuel rail only when a pressure at the outlet of mechanically driven fuel pump 91 (e.g., a compression chamber outlet pressure) is higher than the fuel rail pressure.

Thus, the system of FIGS. 1-3A provides for a vehicle system, comprising: an electric machine; an engine including a mechanically driven fuel pump; a driveline disconnect clutch mechanically coupled to the engine and the electric machine; a belt integrated starter/generator coupled to the engine; and a controller including executable instructions stored in non-transitory memory that cause the controller to adjust the engine to a stop position that is based on a position of the fuel pump in response to a request to adjust an application force to clutch torque capacity relationship of the driveline disconnect clutch. The system further comprises instructions to operate the electric machine in a speed control mode in response to the request. The system includes where the controller generates the request. The system further comprises additional instructions to incrementally increase an application force of the driveline disconnect clutch in response to the request. The system further comprises additional instructions to adjust the engine to the stop position via the belt integrated starter/generator. The system further comprises additional instructions to adjust a position of a fuel pump spill valve in response to the request.

Referring now to FIG. 3B, plots showing an example engine stopping position based on engine position and mechanically driven fuel pump position is shown. The adjustment of engine stopping position may be performed via the system of FIGS. 1-3A according to the method of FIG. 6. Further, the system of FIGS. 1-3A may operate at the conditions described in FIG. 3B via instructions stored in controller memory. The engine rotates from engine positions on the left side of the plot to engine positions on the right side of the plot.

The first plot from the top of FIG. 3B is a plot of cylinder number one piston position versus engine crankshaft position. The vertical axis represents the position of the piston of cylinder number one. The horizontal axis represents engine position, where 0 crankshaft degrees is top-dead-center compression stroke of cylinder number one. The strokes of cylinder number one are abbreviated as Exh. (exhaust), Int. (intake), Com. (compression), and Pow. (power or expansion). Curve 350 represents the position of the piston for cylinder number one.

The second plot from the top of FIG. 3B is a plot of torque to turn the engine versus engine position. The torque to turn or rotate the engine increases in the direction of the vertical axis. The vertical axis represents the torque to turn the engine. The horizontal axis represents engine position, where 0 crankshaft degrees is top-dead-center compression stroke of cylinder number one. Curve 352 represents the torque to turn the engine. Horizontal line 360 represents an upper bound where the engine may be stopped and where torque may be removed from the engine without the engine rotating after torque is removed from the engine. Horizontal line 362 represents a lower bound where the engine may be stopped and where torque may be removed from the engine without the engine rotating after torque is removed from the engine. The engine may rotate if it is stopped at a crankshaft angle where trace 352 is above horizontal line 360 or below horizontal line 362.

The third plot from the top of FIG. 3B is a plot of torque to turn the fuel pump versus engine crankshaft position. The vertical axis represents the torque to turn the fuel pump and the torque to turn increases in the direction of the vertical axis. The horizontal axis represents engine position, where 0 crankshaft degrees is top-dead-center compression stroke of cylinder number one. Curve 354 represents the torque to turn the engine fuel pump.

If the engine is stopped at the location of vertical line 398, the torque to turn the engine is not at a highest level since torque to turn the fuel pump at the location of vertical line 398 is low. The torque to turn the fuel pump is low at vertical line 398 because the fuel pump has passed the peak cam lobe position and it is decreasing in lift, thereby lowering the fuel pump torque to turn. However, torque to turn the engine may be increased via rotating the engine to the location indicated by vertical line 399 via BISG 266. As the engine rotates from location 398 to location 399, the torque to rotate the engine decreases and then it increases. Similarly, the torque to turn the engine fuel pump decreases and then it increases. At location 399, the torque to turn the engine is greatest and the torque to rotate the fuel pump is greatest at a location where the engine will not move forward or backward after torque from BISG 266 or ISG 240 is no longer applied to engine 10. Consequently, torque to rotate the engine and the fuel pump is greatest at a location 399 where the engine will not rotate when torque applied to the engine is released from the engine. Thus, torque to rotate the engine is a function of both engine position and fuel pump position. Further, torque to rotate the engine and fuel pump may be adjusted via rotating the engine and stopping the engine at a particular engine position.

Referring now to FIG. 4, a plot of an example driveline disconnect clutch transfer function adaption sequence is shown. The sequence of FIG. 4 may be provided via the system of FIGS. 1-3A in cooperation with the method of FIG. 6. The plots of FIG. 4 are time aligned and they occur at the same time. Vertical lines at time t0-t4 are times of interest in the sequence. The controller of FIGS. 1 and 2 may include instructions to operate the driveline at the conditions described and shown in FIG. 4.

The first plot of FIG. 4 is a plot of engine operating state versus time. The vertical axis represents engine operating state and the engine is operating when trace 402 it at a higher level near the vertical axis arrow. The horizontal axis represents time and time increases from the left side of the figure to the right side of the figure. Trace 402 represents engine operating state.

The second plot of FIG. 4 is a plot of torque to turn the engine (torque needed to rotate the engine) versus time. The vertical axis represents torque to turn the engine and torque to turn the engine increases in the direction of the vertical axis arrow. Trace 404 represents torque to turn the engine. The horizontal axis represents time and time increases from the left side of the figure to the right side of the figure.

The third plot of FIG. 4 is a plot of torque to turn (torque needed to rotate the fuel pump) the fuel pump versus time. The vertical axis represents torque to turn the fuel pump and torque to turn the fuel pump increases in the direction of the vertical axis arrow. Trace 406 represents torque to turn the fuel pump. The horizontal axis represents time and time increases from the left side of the figure to the right side of the figure.

The fourth plot of FIG. 4 is a plot of electric isolation switch 260 state versus time. The vertical axis represents electric isolation switch state and the electric isolation switch is closed (allows current flow through the isolation switch) when trace 408 is at a higher level near the vertical axis arrow. The electric isolation switch is open (prevents current flow through the isolation switch) when trace 408 is at a lower level near the horizontal axis. Trace 408 represents electric isolation switch state. The horizontal axis represents time and time increases from the left side of the figure to the right side of the figure.

The fifth plot of FIG. 4 is a plot of BISG state versus time. The vertical axis represents BISG state and BISG is off when trace 410 is at a lower level near the horizontal axis. The BISG is providing a positive torque to the driveline when trace 410 is at a higher level near the vertical axis arrow. The BISG is providing a negative or holding torque when trace 410 is near the middle level. Trace 410 represents BISG state. The horizontal axis represents time and time increases from the left side of the figure to the right side of the figure.

The sixth plot of FIG. 4 is a plot of driveline disconnect clutch transfer function adaptation request state versus time. The vertical axis represents driveline disconnect clutch transfer function adaptation request and the driveline disconnect clutch transfer function adaptation request is asserted when trace 412 is near the vertical axis arrow. The driveline disconnect clutch transfer function adaptation request is not asserted when trace 412 is near the horizontal axis arrow. Trace 412 represents the driveline disconnect clutch transfer function adaptation request state. The horizontal axis represents time and time increases from the left side of the figure to the right side of the figure.

The seventh plot of FIG. 4 is a plot of driveline disconnect clutch transfer function adaptation state versus time. The vertical axis represents driveline disconnect clutch transfer function adaptation state and the driveline disconnect clutch transfer function adaptation state indicates that the driveline disconnect clutch transfer function is being adapted when trace 414 is near the vertical axis arrow. Driveline disconnect clutch transfer function adaptation is not occurring when trace 414 is near the horizontal axis. Trace 414 represents driveline disconnect clutch transfer function adaptation request state. The horizontal axis represents time and time increases from the left side of the figure to the right side of the figure.

FIG. 4 shows an example driveline disconnect clutch transfer function adaptation sequence where an engine is stopped and then repositioned to increase torque to turn the engine and the engine's fuel pump so that a larger torque range of a driveline disconnect clutch transfer function may be adapted (e.g., adjusted to improve accuracy).

At time t0, the engine is operating (e.g., combusting air and fuel) and the torque to turn the engine is zero since the engine is operating under its own power. The torque to turn the fuel pump is also zero since the engine is rotating under its own power. The electric isolation switch is closed to allow electrical current to flow through the electric isolation switch. The BISG is not activated and the driveline disconnect clutch transfer function adaptation request is not asserted. The driveline disconnect clutch adaptation state indicates that the driveline disconnect clutch transfer function is not being adapted.

Between time t0 and time t1, the engine ceases rotating and it stops. The electric isolation switch remains closed and the BISG is not activated. The driveline disconnect clutch transfer function adaptation request is not asserted and the driveline disconnect clutch transfer function is not being adapted.

At time t1, the driveline disconnect clutch transfer function adaptation request is asserted. The driveline disconnect clutch transfer function adaptation request may be asserted in response to distance driven by the vehicle, presence of driveline torque disturbances, or a manual request to adapt the driveline disconnect clutch transfer function. The engine remains stopped (e.g., not rotating) and the engine torque to rotate and the fuel pump torque to rotate are determined to be non-zero responsive to the engine stopping position.

At time t2, the electric isolation switch is opened, the BISG is activated, and the driveline disconnect clutch transfer function adaptation request remains asserted. Opening the electric isolation switch reduces the possibility of changes to voltage of the low voltage DC bus 262. The engine remains stopped (e.g., not rotating) and the engine torque to rotate and the fuel pump torque to rotate remain at their previous respective values. The ISG also begins to rotate one side of the driveline disconnect clutch (not shown).

Between time t2 and time t3, the BISG rotates the engine and the torque to turn the engine and torque to turn the engine fuel pump change as engine position changes. The engine is not combusting air and fuel and the electric isolation switch remains open. The driveline disconnect clutch transfer function adaptation request remains asserted and the driveline disconnect clutch transfer function is not being adapted.

At time t3, the BISG stops rotating the engine and the engine torque to turn and the fuel pump torque to turn are at higher levels so that more torque is required to begin rotating the engine. The engine is stopped at a position where it does not rotate in a forward or reverse direction when torque applied to the engine via the BISG is removed. The BISG also begins to provide a holding torque (e.g., a negative torque that resists the engine crankshaft from moving) to the driveline and the engine crankshaft. The driveline disconnect clutch transfer function adaptation begins shortly after time t3 as indicated by trace 414 transitioning to a higher level.

Between time t3 and time t4, application pressure provided to the driveline disconnect clutch increases so that torque transferred via the driveline disconnect clutch increases. However, since the engine is positioned where its torque to turn is high, the engine does not rotate. The controller determines torque transferred via the driveline disconnect clutch and the application force applied to the driveline disconnect clutch. Values within the driveline disconnect clutch transfer function may be adjusted responsive to the application force and the torque transferred via the driveline disconnect clutch.

At time t4, the driveline disconnect clutch adaptation request is withdrawn and the driveline disconnect clutch adaptation ceases. The BISG is deactivated and the electric isolation switch is closed so that the low voltage batteries may exchange power. The engine remains deactivated and the torque to turn the engine and the fuel pump remains at their previous values. The ISG stops rotating (not shown).

In this way, the driveline disconnect clutch transfer function may be adjusted while the engine provides a torque to ground (e.g., prevent from moving) the driveline disconnect clutch when the ISG is rotating the other side of the driveline disconnect clutch. Values included within the driveline disconnect clutch transfer function may be adjusted as the application force applied to the driveline disconnect clutch increases.

Referring now to FIG. 5, a driveline disconnect clutch transfer function 500 is shown. Transfer function 500 may alternatively be described as an application force to clutch torque capacity relationship. Curve 502 may be determined from a plurality of data points, such as 512, that are a function of driveline disconnect clutch apply pressure and driveline disconnect clutch torque capacity (e.g., an amount of torque the driveline disconnect clutch may transfer). Driveline disconnect clutch transfer function 500 may be adjusted via increasing the clutch application pressure while monitoring the driveline disconnect clutch torque capacity. The driveline disconnect clutch torque capacity may be determined based on ISG current. For example, ISG current used to rotate the transmission input shaft and one side of the driveline disconnect clutch may be determined from ISG current when the driveline disconnect clutch is fully open and when the ISG is operated in a speed control mode (e.g., ISG torque may vary to operate the ISG at a desired speed). Then the driveline disconnect clutch may be closed slowly so that driveline disconnect clutch torque capacity increases. The ISG speed follows the desired ISG speed, which may be a constant speed, and the ISG electrical current increases as the driveline disconnect clutch torque capacity increases. The ISG electrical current may then be converted to a torque. In particular, the torque for the ISG to rotate the driveline with the driveline disconnect clutch open is subtracted from the torque to rotate the driveline when the application pressure supplied to the driveline disconnect clutch is increased to determine the driveline disconnect clutch torque capacity for a given driveline disconnect clutch application pressure. For example, driveline disconnect clutch application pressure at 532 corresponds to a driveline disconnect clutch torque capacity 522. Data point 530 represents the intersection of driveline disconnect clutch application pressure 532 and driveline disconnect clutch torque capacity 522. Curve 512 may be based on a plurality of points similar to 530.

Driveline disconnect clutch transfer function 500 may be utilized as follows: if it is desired for the driveline disconnect clutch to transfer 200 Newton-meters (N-m) of torque, then driveline disconnect clutch transfer function 500 may be referenced by a torque capacity of 200 N-m (e.g., the vertical axis variable) to find a corresponding driveline disconnect clutch apply pressure (e.g., the horizontal axis variable) that provides the driveline disconnect clutch torque capacity of 200 N-m. The driveline disconnect clutch application pressure may then be applied to the driveline disconnect clutch so that the driveline disconnect clutch may transfer up to 200 N-m.

Referring now to FIG. 6, a flowchart for operating a hybrid vehicle is shown. At least portions of the method of FIG. 6 may be incorporated as executable instructions stored in non-transitory memory of the system shown in FIGS. 1-3A. Additionally, portions of the method of FIG. 6 may take place in the physical world as operations or actions performed by a controller to transform an operating state of one or more devices. Some of the control parameters described herein may be determined via receiving input from the sensors and actuators described previously. The method of FIG. 6 may also provide the operating sequence shown in FIG. 5 and the driveline may operate at the conditions described herein via instructions stored in controller memory.

At 602, method 600 determines vehicle operating conditions. Vehicle operating conditions may include but are not limited to engine speed, engine position, fuel pump position, driveline disconnect clutch application pressure, driveline disconnect clutch torque transfer capacity, ISG speed and torque, DC/DC isolation switch state, BISG operating state, and engine operating state. Method 600 may determine the operating conditions from the various sensors described herein.

At 604, method 600 judges if driveline disconnect clutch transfer function adaptation is requested. Method 600 or another routine may request driveline disconnect clutch transfer function adaptation. In one example, the driveline disconnect clutch may be adapted based on distance traveled by a vehicle, a time since the driveline disconnect clutch transfer function was last adapted, a level of driveline torque disturbances, or other conditions. For example, method 600 may request driveline disconnect clutch transfer function adaptation if the vehicle has traveled 10,000 Kilometers without the driveline disconnect clutch being adapted. Alternatively, method 600 may request driveline disconnect clutch transfer function adaptation after each 100 hours of vehicle operation. If method 600 judges that driveline disconnect clutch transfer function adaptation is requested, the answer is yes and method 600 proceeds to 606. Otherwise, the answer is no and method 600 proceeds to 640. Method 600 may also require that the vehicle's transmission is engaged in neutral or park before method 600 proceeds to 606.

At 640, method 600 engages and disengages the driveline disconnect clutch responsive to a driveline disconnect clutch transfer function existing in controller memory. The driveline disconnect clutch transfer function may be input to a controller during manufacturing of the vehicle or the driveline disconnect clutch transfer function may include adapted or adjusted values based on vehicle operating conditions. Method 600 proceeds to exit.

At 606, method 600 stops engine rotation. Engine rotation may be ceased by stopping flow of fuel to engine cylinders. Further, spark supplied to engine cylinders may be ceased. Engine rotation is ceased so that the engine may ground one side of the driveline disconnect clutch to facilitate driveline disconnect clutch transfer function adaptation. By grounding one side of the driveline disconnect clutch, it may be assured that all torque transferred through the driveline disconnect clutch is reflected in the driveline disconnect clutch torque capacity. The driveline disconnect clutch is also fully opened. Method 600 proceeds to 608 after ceasing engine rotation.

At 608, method 600 determines engine position and fuel pump position. Engine position and fuel pump position may be determined from engine crankshaft position and engine camshaft position. In one example, the crankshaft indicates a new crankshaft position each 10 crankshaft degrees via wheel teeth. The camshaft position may be indicated via a plurality of wheel teeth for each engine revolution. Engine and fuel pump positions where torque to turn the engine and the fuel pump is greatest or larger than at other engine positions may be stored to controller memory. Method 600 proceeds to 610.

At 610, method 600 adjusts operation of a spill valve 312 that regulates an amount of fuel entering the mechanically driven fuel pump 91. In one example, spill valve 312 is commanded open to provide a maximum amount of fuel to enter fuel pump 91. For example, if fuel pump 91 has capacity to pump between 1 and 4 cubic centimeters of fuel, then spill valve 312 is operated to allow 4 cubic centimeters into the fuel pump 91. Spill valve 312 may be commanded on and/or off as the engine 10 is rotated. By increasing the amount of fuel entering the fuel pump 91, the torque needed to rotate the fuel pump 91 may be increased. In addition, increasing the torque to turn of fuel pump 91 may increase the range of driveline disconnect clutch torque capacity that may be the basis for adjusting the driveline disconnect clutch transfer function. For example, if the torque to turn of fuel pump 91 may be increased by 5 N-m, then the driveline disconnect clutch transfer function may adapt up to a torque capacity of 55 N-m instead of a torque capacity of 50 N-m. Method 600 proceeds to 612 after adjusting the fuel pump spill valve to increase the torque to turn the engine fuel pump.

At 612, method 600 rotates the engine and the fuel pump via the BISG while the driveline disconnect clutch is fully open. The engine and the fuel pump may be rotated to a position that is stored in controller memory. The engine may be rotated in a forward or reverse direction to arrive at the predetermined engine position. The predetermined engine position may be an engine position where torque applied to rotate the engine and fuel pump exceeds a threshold torque and where the engine does not rotate after torque applied to the engine via the BISG is released after rotating the engine. The engine position may be an engine position where engine compression torque (e.g., torque to turn the engine against pressure in the cylinder) is greatest without the engine moving more than a predetermined actual total number of crankshaft degrees once torque is no longer applied to the engine. Once the engine reaches the predetermined position, rotation of the engine is stopped and the BISG does not apply torque to rotate the engine. Method 600 proceeds to 614.

At 614, method 600 adjusts a position of a front end accessory drive (FEAD) pre-tensioner 267, opens an electric isolation switch 260, and applies a holding torque to engine 10 via BISG 266. In one example, the FEAD pre-tensioner 267 is activated, the electric isolation switch 260 is opened, and the BISG is commanded to provide a negative (e.g., maximum) holding torque to prevent engine rotation. The FEAD pre-tensioner may be activated to reduce belt slip between the BISG 266 and the engine 10 so that engine position may be maintained during driveline disconnect clutch transfer function adaptation. Further, opening the electric isolation switch 260 may reduce voltage disturbances to other vehicle electric systems while the driveline disconnect clutch transfer function is being adjusted. Increasing the BISG holding torque may allow greater application pressures to be applied to the driveline disconnect clutch before the engine rotates and driveline disconnect clutch transfer function adaptation is ceased. Method 600 proceeds to 616.

At 616, method 600 operates the ISG 240 in a speed control mode (e.g., where ISG torque varies and ISG speed is maintained at or follows the desired ISG speed) at a constant speed. By operating the ISG in speed control mode, an accurate estimate of driveline disconnect clutch torque capacity may be determined. One or more transmission clutches may also be opened so that the ISG 240 does not rotate the vehicle wheels. Method 600 also determines torque to rotate the ISG at constant speed. In one example, ISG current is used to references a table or function that outputs ISG torque as a function of ISG current. Method 600 proceeds to 618.

At 618, method 600 incrementally increases application pressure applied to close the driveline disconnect clutch. Each time the application pressure applied to the disconnect clutch is increased, driveline disconnect clutch torque capacity is determined from the ISG torque. In particular, electric current supplied to the ISG 240 is determined via sensing current supplied to the ISG 240. Then, ISG torque is determined from the ISG current via a function that relates ISG current to ISG torque. The ISG torque supplied when the driveline disconnect clutch was fully open is subtracted from the ISG torque at the present driveline disconnect clutch application pressure or force to determine the driveline disconnect clutch torque capacity for the present driveline disconnect clutch application pressure or force. The driveline disconnect clutch application pressure or force may be increased until the engine begins to rotate. Driveline disconnect clutch transfer function adaptation may cease when the engine begins to rotate. Method proceeds to 620 after adjusting driveline disconnect clutch application pressure to a plurality of distinct application pressures.

At 620, method 600 may adjust values in the driveline disconnect clutch transfer function. In particular, if driveline torque capacity for a particular driveline disconnect clutch application force as determined at 618 changes by more than a threshold amount (e.g., 10%) from a corresponding torque capacity for a same driveline disconnect clutch application force stored in controller memory, then a value of the driveline disconnect clutch transfer function stored in controller memory is adjusted to the value determined at 618. One or more values of the driveline disconnect clutch transfer function stored in controller memory may be adjusted in this way. Method 600 proceeds to 622.

At 622, method 600 judges if one or more of the following conditions have been met. Method 600 judges if a timer that estimates pressure decay within engine cylinders has expired or if the engine has not been rotating for longer than a threshold amount of time since the most recent time the engine stopped rotating. Method 600 also judges if BISG temperature is greater than (G.T.) a threshold. Further, method 600 may judge if adaptation of the driveline disconnect clutch transfer function is complete. If the answer is yes to any of the mentioned conditions, method 600 proceeds to 624. Otherwise, method 600 returns to 618.

At 624, method 600 ceases adapting the driveline disconnect clutch transfer function. Method 600 also opens the driveline disconnect clutch, ceases to rotate ISG 240, deactivates BISG 266, and deactivates the FEAD pre-tensioner 267. Method 600 proceeds to exit.

In this way, method 600 may adapt a driveline disconnect clutch transfer function and adjust actuators of the driveline to improve driveline disconnect clutch adaptation. Further, it may be possible to adapt the driveline disconnect clutch transfer function for higher driveline disconnect clutch application pressures.

Thus, method 700 provides for a vehicle operating method, comprising: requesting adjustment of an application force to clutch torque capacity relationship; adjusting a stopping position of an engine in response to the request; and adjusting the application force to clutch torque capacity relationship. The method includes where application force to clutch torque capacity relationship is stored in controller memory. The method includes where adjusting the stopping position of the engine includes adjusting the engine to a position based on engine compression torque. The method includes where the engine position based on engine compression torque is an engine position where the engine rotates less than a predetermined actual total number of crankshaft degrees after the engine is stopped at the engine position and torque applied to the engine via an electric machine is released. The method further comprises operating an electric machine in a speed control mode and incrementally closing a driveline disconnect clutch in response to the request before adjusting the application force to clutch torque capacity relationship. The method further comprises not operating the electric machine in the speed control mode and incrementally closing the driveline disconnect clutch unless a transmission coupled to the electric machine is in park or neutral. The method further comprises not adjusting the application force to clutch torque capacity relationship in response to the engine moving.

The method also provides for a vehicle operating method, comprising: requesting adjustment of an application force to clutch torque capacity relationship; adjusting a fuel pump spill control valve in response to the request; and adjusting the application force to clutch torque capacity relationship. The method includes where the application force to clutch torque capacity relationship describes operation of a driveline disconnect clutch, the driveline disconnect clutch positioned in a driveline between an engine and an electric machine. The method further comprises adjusting a position of the engine to a predetermined engine position where torque to turn a fuel pump is greater than a threshold torque.

The method further comprises opening a low voltage isolation switch in response to the request. The method further comprises activating a front end accessory drive pre-tensioner in response to the request. The method further comprises rotating an engine in response to the request via a belt integrated starter/generator, stopping the engine at a predetermined position, and then applying a holding torque to the driveline via the belt integrated starter/generator. The method includes where the predetermined position is based on a position of a fuel pump.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   requesting adjustment of an application force to clutch torque capacity relationship via a controller;
   adjusting a stopping position of an engine via the controller in response to the request; and
   adjusting the application force to clutch torque capacity relationship via the controller.

2. The method of claim 1, where the application force to clutch torque capacity relationship is stored in controller memory.

3. The method of claim 1, where adjusting the stopping position of the engine includes adjusting the engine to a position based on engine compression torque.

4. The method of claim 3, where the engine position based on engine compression torque is an engine position where the engine rotates less than a predetermined actual total number of crankshaft degrees after the engine is stopped at the engine position and torque applied to the engine via an electric machine is released.

5. The method of claim 1, further comprising operating an electric machine in a speed control mode and incrementally closing a driveline disconnect clutch via the controller in response to the request before adjusting the application force to clutch torque capacity relationship.

6. The method of claim 5, further comprising not operating the electric machine in the speed control mode and incrementally closing the driveline disconnect clutch unless a transmission coupled to the electric machine is in park or neutral via the controller.

7. The method of claim 5, further comprising not adjusting the application force to clutch torque capacity relationship in response to the engine moving via the controller.

8. A vehicle operating method, comprising:
   requesting adjustment of an application force to clutch torque capacity relationship via a controller;
   adjusting a fuel pump spill control valve in response to the request via the controller; and
   adjusting the application force to clutch torque capacity relationship via the controller.

9. The method of claim 8, where the application force to clutch torque capacity relationship describes operation of a driveline disconnect clutch, the driveline disconnect clutch positioned in a driveline between an engine and an electric machine.

10. The method of claim 9, further comprising adjusting a position of the engine to a predetermined engine position where torque to turn a fuel pump is greater than a threshold torque via the controller.

11. The method of claim 8, further comprising opening a low voltage isolation switch in response to the request via the controller.

12. The method of claim 8, further comprising activating a front end accessory drive pre-tensioner in response to the request via the controller.

13. The method of claim 8, further comprising rotating an engine in response to the request via a belt integrated starter/generator, stopping the engine at a predetermined position, and then applying a holding torque to the driveline via the belt integrated starter/generator.

14. The method of claim 13, where the predetermined position is based on a position of a fuel pump.

15. A vehicle system, comprising:
   an electric machine;
   an engine including a mechanically driven fuel pump;
   a driveline disconnect clutch mechanically coupled to the engine and the electric machine;
   a belt integrated starter/generator coupled to the engine; and
   a controller including executable instructions stored in non-transitory memory that cause the controller to request to adjust a relationship between clutch application force and clutch torque capacity, and to adjust the engine to a stop position that is based on a position of the fuel pump in response to the request to adjust the relationship between clutch application force and clutch torque capacity of the driveline disconnect clutch.

16. The system of claim 15, further comprising instructions to operate the electric machine in a speed control mode in response to the request.

17. The system of claim 15, further comprising additional instructions to incrementally increase an application force of the driveline disconnect clutch in response to the request.

18. The system of claim 15, further comprising additional instructions to adjust the engine to the stop position via the belt integrated starter/generator.

19. The system of claim 15, further comprising additional instructions to adjust a position of a fuel pump spill valve in response to the request.

\* \* \* \* \*